(12) United States Patent
Jensen et al.

(10) Patent No.: US 8,544,484 B2
(45) Date of Patent: Oct. 1, 2013

(54) WIND TURBINE BLADE TREATMENT APPARATUSES AND METHODS

(76) Inventors: Dustin Jensen, Draper, UT (US); Broque L. Fraughton, Evanston, WY (US); Sonny K. Fraughton, Evanston, WY (US)

(*) Notice: Subject to any disclaimer, the term of this patent is extended or adjusted under 35 U.S.C. 154(b) by 0 days.

(21) Appl. No.: 13/167,294

(22) Filed: Jun. 23, 2011

(65) Prior Publication Data

US 2011/0318496 A1 Dec. 29, 2011

Related U.S. Application Data

(60) Provisional application No. 61/357,701, filed on Jun. 23, 2010.

(51) Int. Cl.
*B08B 3/02* (2006.01)

(52) U.S. Cl.
USPC ............ 134/199; 134/113; 134/137; 134/198

(58) Field of Classification Search
None
See application file for complete search history.

(56) References Cited

U.S. PATENT DOCUMENTS

| 4,962,560 | A  | * | 10/1990 | Moore ........................... 15/53.3 |
|-----------|----|---|---------|------------------------------------------|
| 5,352,297 | A  |   | 10/1994 | Peters                                   |
| 6,431,224 | B1 | * | 8/2002  | Fry .................................... 141/8 |
| 2005/0042102 | A1 | * | 2/2005 | Teichert ..................... 416/146 R |
| 2006/0054202 | A1 |   | 3/2006 | Luke et al. |
| 2006/0175465 | A1 |   | 8/2006 | Teichert |
| 2007/0056801 | A1 |   | 3/2007 | Iverson |
| 2007/0283984 | A1 | * | 12/2007 | Fratello et al. ................ 134/43 |
| 2009/0020361 | A1 |   | 1/2009 | Teichert |
| 2009/0169734 | A1 |   | 7/2009 | Teichert |
| 2010/0018551 | A1 |   | 1/2010 | Gallegos |
| 2010/0132137 | A1 | * | 6/2010 | Eggleston ..................... 15/21.1 |
| 2010/0132738 | A1 |   | 6/2010 | Kumar et al. |
| 2011/0088723 | A1 |   | 4/2011 | Jensen |

FOREIGN PATENT DOCUMENTS

| JP | 2005-211885 | 8/2005 |
| JP | 2008/309098 | 12/2008 |

OTHER PUBLICATIONS

U.S. Appl. No. 12/582,287, filed Oct. 20, 2009; Dustin Jensen; office action issued Nov. 15, 2011.
Related Matter: U.S. Appl. No. 13/080,297, filed Apr. 5, 2011; Dustin Jensen.
PCT Application PCT/US2010/061595; filed Dec. 21, 2010; Dustin Jensen; International Search Report mailed Sep. 15, 2011.
PCT Application PCT/US2011/041662; filed Jan. 19, 2012; Dustin Jensen; International Search Report mailed Jan. 19, 2012.

(Continued)

*Primary Examiner* — Michael Kornakov
*Assistant Examiner* — Ryan Coleman
(74) *Attorney, Agent, or Firm* — Thorpe North & Western LLP (57) ABSTRACT

In an embodiment of the present disclosure, a wind turbine blade treatment apparatus comprises a support having a frame with an edge follower configured to be positioned near an edge of a wind turbine blade. The support also includes a side member connected to the frame, configured to extend at least partially along a width of the wind turbine blade and to be positionable near the wind turbine blade. The wind turbine blade treatment apparatus further comprises a sprayer connected to the support, configured to spray fluid onto the wind turbine blade.

29 Claims, 5 Drawing Sheets

(56) References Cited

OTHER PUBLICATIONS

U.S. Appl. No. 12/582,287, filed Oct. 20, 2009; Dustin Jensen; office action dated Jul. 9, 2012.
U.S. Appl. No. 13/080,297; filed 04/05/201; Dustin Jensen; office action dated Jul. 11, 2012.
U.S. Appl. No. 12/528,287, filed Oct. 20, 2009; Dustin Jensen; notice of allowance dated Sep. 26, 2012.
U.S. Appl. No. 13/080,297, filed Apr. 5, 2011; Dustin Jensen; notice of allowance dated Oct. 9, 2012.
PCT/US12/31591; international filing date Mar. 30, 2012; Dustin Jensen; International Search Report dated Jul. 20, 2012.

* cited by examiner

WIND TURBINE BLADE TREATMENT APPARATUSES AND METHODS

The present application claims the benefit of U.S. Provisional Patent Application No. 61/357,701, filed on Jun. 23, 2010, the entirety of which is incorporated herein by reference.

BACKGROUND

Wind turbines are increasing in prominence and popularity as a source of clean energy production. Wind currents cause blades of a wind turbine to rotate, converting the kinetic energy of the rotating blades into usable electrical or mechanical energy.

Wind turbines are often erected in areas having few obstacles obstructing wind currents to maximize a potential energy output. Such areas are sometimes remote and may be accessed only by traversing poorly maintained roads. This can present some difficulty in accessing the wind turbine for maintenance and other operations. Various types of maintenance may be performed on wind turbines. Maintenance of outer components of the wind turbines, such as the wind turbine blades or the surface of the wind turbine tower, becomes increasingly difficult as a size of wind turbines increases in attempts to generate more energy.

Repairs and cleaning are some of the more common maintenance issues facing owners of wind turbines. Maintenance of wind turbines often involves periodic lifting or lowering of wind turbine parts, equipment, maintenance personnel, etc. Some specific examples of maintenance operations involving lifting or lowering of objects include inspection of the wind turbine blades, cleaning the wind turbine blades and tower, providing replacement of parts, etc.

Prior maintenance systems have generally utilized free-standing cranes or other forms of lifts to raise and/or lower objects in connection with maintenance or repair of outer components of wind turbines. However, due to the difficulty in accessing wind turbines because of location, transportation of the cranes or lifts to the wind turbines can be difficult, costly, and time consuming.

Wind turbine cleaning is generally performed on a periodic, regular basis. Cleaning wind turbine blades and tower supports can be useful for a variety of purposes, such as maintaining an efficiency of the wind turbine, extending a useful life of the blades and towers, maintaining a clean and well-maintained appearance, etc. Wind turbines are sometimes cleaned as frequently as two or more times per year.

Over relatively short periods of use (such as a matter of weeks or months), wind turbines can become defiled by dust, coatings of salt, dead insects, bird excrement and other surface deposits. Wind turbine defilement can reduce the efficiency, worsen the appearance, and/or lead to corrosive and other detrimental effects on the wind turbine surfaces. A sealant can be applied to wind turbine surfaces for additional protection. However, application of the sealant may still involve difficulties and hazards similar to those encountered in cleaning or performing other maintenance. Further, the sealant may also need to be periodically re-applied and the use of a sealant generally does not prevent or reduce defilement of wind turbine surfaces.

Because of various factors such as the size and location of wind turbines, cleaning and other maintenance can be a difficult and time-consuming process. Further, wind turbine maintenance can be hazardous for maintenance workers. Accordingly, there is a need for wind turbine cleaning and maintenance which is simpler, faster, and which allows for a safer and more stable condition for maintenance workers.

SUMMARY

The present disclosure relates to apparatuses and methods for moving objects in connection with a wind turbine or a similar construction. More specifically, the disclosure also relates to devices, systems, and methods for treating, such as by cleaning or coating (e.g., protective coating or paint), a wind turbine blade or similar construction.

A wind turbine blade cleaning or coating apparatus is provided in accordance with an embodiment of the present disclosure. More specifically, a wind turbine blade treatment apparatus can comprise a support including a frame with an edge follower configured to be positioned at or near an edge (e.g., leading edge or trailing edge) of a wind turbine blade, and a side member connected to the frame. The side member is configured to extend at least partially along a width of the wind turbine blade and to be positionable near the wind turbine blade. The treatment apparatus also includes a sprayer connected to the support which is configured to spray fluid onto the wind turbine blade.

In another embodiment, a wind turbine blade treatment apparatus can comprise a support configured to extend at least partially along a width of the wind turbine blade, the support further including an edge follower configured to be positioned at or near an edge of a wind turbine blade, and a biased hinge configured to allow for contraction or expansion of the support in relation to a dimension of the wind turbine blade. A sprayer is connected to the support and is configured to spray fluid onto the wind turbine blade.

In another embodiment, a wind turbine blade treatment system can comprise a wind turbine blade treatment apparatus, a conveyer, and a fluid supply. The wind turbine blade treatment apparatus includes a support with an edge follower configured to be positioned at or near an edge of a wind turbine blade, the support is also configured to extend at least partially along a width of the wind turbine blade and to be positionable at or near the wind turbine blade. The treatment apparatus also includes a sprayer connected to the support and is configured to spray fluid onto the wind turbine blade. The conveyor is connected to the wind turbine blade treatment apparatus, and is configured to move the treatment apparatus along a length of the wind turbine blade. The fluid supply is connected to the wind turbine blade treatment apparatus as well, and is configured to supply fluid to the sprayer.

In another embodiment, a method for treating a wind turbine blade can comprise positioning a support with an edge follower at or near an edge of a wind turbine blade, wherein the support is configured to contact the wind turbine blade with at least some pressure when in position; moving the support along a length of the wind turbine blade, thereby causing the edge follower to follow an edge of the wind turbine blade such that the support as a whole at least partially extends along a width of the wind turbine blade as the support moves along the length of the wind turbine blade; and spraying fluid onto the wind turbine blade.

DETAILED DESCRIPTION

Reference will now be made to the exemplary embodiments illustrated, and specific language will be used herein to describe the same. It will nevertheless be understood that no limitation of the scope of the invention is thereby intended. Additional features and advantages of the invention will be apparent from the detailed description which follows, taken in conjunction with the accompanying drawings, which together illustrate, by way of example, features of the invention.

Wind turbine maintenance and cleaning has been attempted by using large cranes and lift apparatuses. However, as has been described, the use of such devices can present difficulties in terms of access, expense, etc. Other systems have been used which attempt to reduce difficulties of access by removing or reducing the need for transporting large and heavy equipment to wind turbine sites. For example, skilled climbers may use ropes to traverse a side of a wind turbine tower or blade. However, a lack of climbing experience can be hazardous to maintenance workers and some issues with maintenance and repair are not easily addressed by an individual on a rope on the side of the wind turbine tower. Particularly when large or heavy parts are involved for installation, repairs, etc., an individual on a rope may have significant difficulty in performing the maintenance operations. Another system for maintenance and cleaning involves the installation of a crane and a cable basket underneath the nacelle of the wind turbine which allows the basket to be lowered down the side of the wind turbine. However, the basket can be difficult to position correctly and difficult to work from due to an unstable nature.

Regardless of the approach to maintenance and cleaning, many prior systems have still involved significant manual labor. The wind turbine blades are generally brought to a halt and workers are raised or lowered to various positions on wind turbine towers or blades in order to clean a particular section of the wind turbine. After workers have finished working at one portion of the wind turbine, they may be raised or lowered to another portion or even may be repositioned at different positions around the wind turbine blade to be able to clean the wind turbine blade on all sides from end to end. Providing cleaning means to the workers can be difficult. Positioning and re-positioning the workers can be time-consuming and difficult. Cleaning using prior methods can take up to several weeks to complete and can be very costly. Furthermore, some wind turbines are located at sea, which can increase difficulty and cost in cleaning even further.

To reduce cost, cleaning time, difficulty, and hazardousness of wind turbine cleaning, wind turbine blade treatment apparatuses are provided in accordance with embodiments of the present disclosure. In one example, the apparatus includes a support. The support comprises a frame with an edge follower configured to be positioned near an edge of a wind turbine blade. The support also comprises a side member connected to the frame, configured to extend at least partially along a width of the wind turbine blade and to be positionable near the wind turbine blade. The apparatus further includes a sprayer connected to the support, and configured to spray fluid onto the wind turbine blade.

In another embodiment, a wind turbine blade treatment apparatus can comprise a support configured to extend at least partially along a width of the wind turbine blade, the support further including an edge follower configured to be positioned at or near an edge of a wind turbine blade, and a biased hinge configured to allow for contraction or expansion of the support in relation to a dimension of the wind turbine blade. A sprayer is connected to the support and is configured to spray fluid onto the wind turbine blade.

In another example, a wind turbine blade treatment system can comprise a wind turbine blade treatment apparatus, a conveyer, and a fluid supply. The wind turbine blade treatment apparatus includes a support with an edge follower configured to be positioned at or near an edge of a wind turbine blade, the support is also configured to extend at least partially along a width of the wind turbine blade and to be positionable at or near the wind turbine blade. The treatment apparatus also includes a sprayer connected to the support and is configured to spray fluid onto the wind turbine blade. The conveyor is connected to the wind turbine blade treatment apparatus, and is configured to move the treatment apparatus along a length of the wind turbine blade. The fluid supply is connected to the wind turbine blade treatment apparatus as well, and is configured to supply fluid to the sprayer.

In another embodiment, a method for treating a wind turbine blade can comprise positioning a support with an edge follower at or near an edge of a wind turbine blade, wherein the support is configured to contact the wind turbine blade with at least some pressure when in position; moving the support along a length of the wind turbine blade, thereby causing the edge follower to follow an edge of the wind turbine blade such that the support as a whole at least partially extends along a width of the wind turbine blade as the support moves along the length of the wind turbine blade; and spraying fluid onto the wind turbine blade.

It is noted that in describing the apparatus, systems, and methods herein, emphasis is placed on cleaning and rinsing embodiments. This is done for purposes of clearly describing the apparatus, and not to disclaim embodiments where each fluid is not specifically described. Thus, it is noted that in each case where cleaning is described as the treatment, painting or surface treating embodiments are expressly included in such discussions, and vice versa. Any minor modifications that could be used to accomplish this are included herein, and could include, for example, replacing the cleaning solution with paint or other surface treatment composition, modifying hosing or sprayers to facilitate the use of a different fluid (paint sprayers used rather than cleaning sprayers), modifying positioning of sprayers to enable appropriate coverage, etc. Such modifications would be apparent to one skilled in the art after considering the present disclosure.

Figure 1:
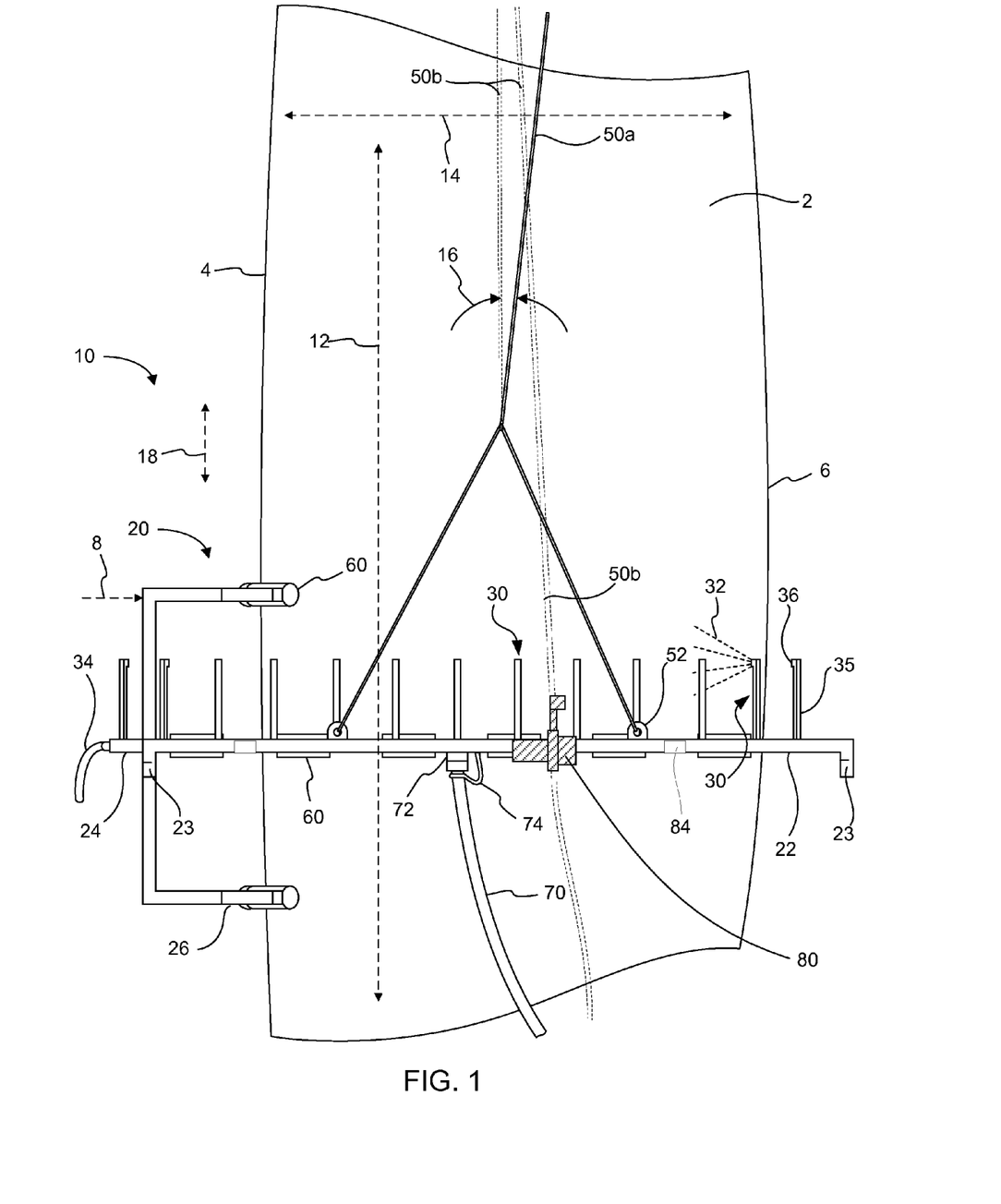
FIG. 1 is a side view of a wind turbine blade treatment apparatus positioned around a wind turbine blade, in accordance with an embodiment of the present disclosure.
Figure 2:
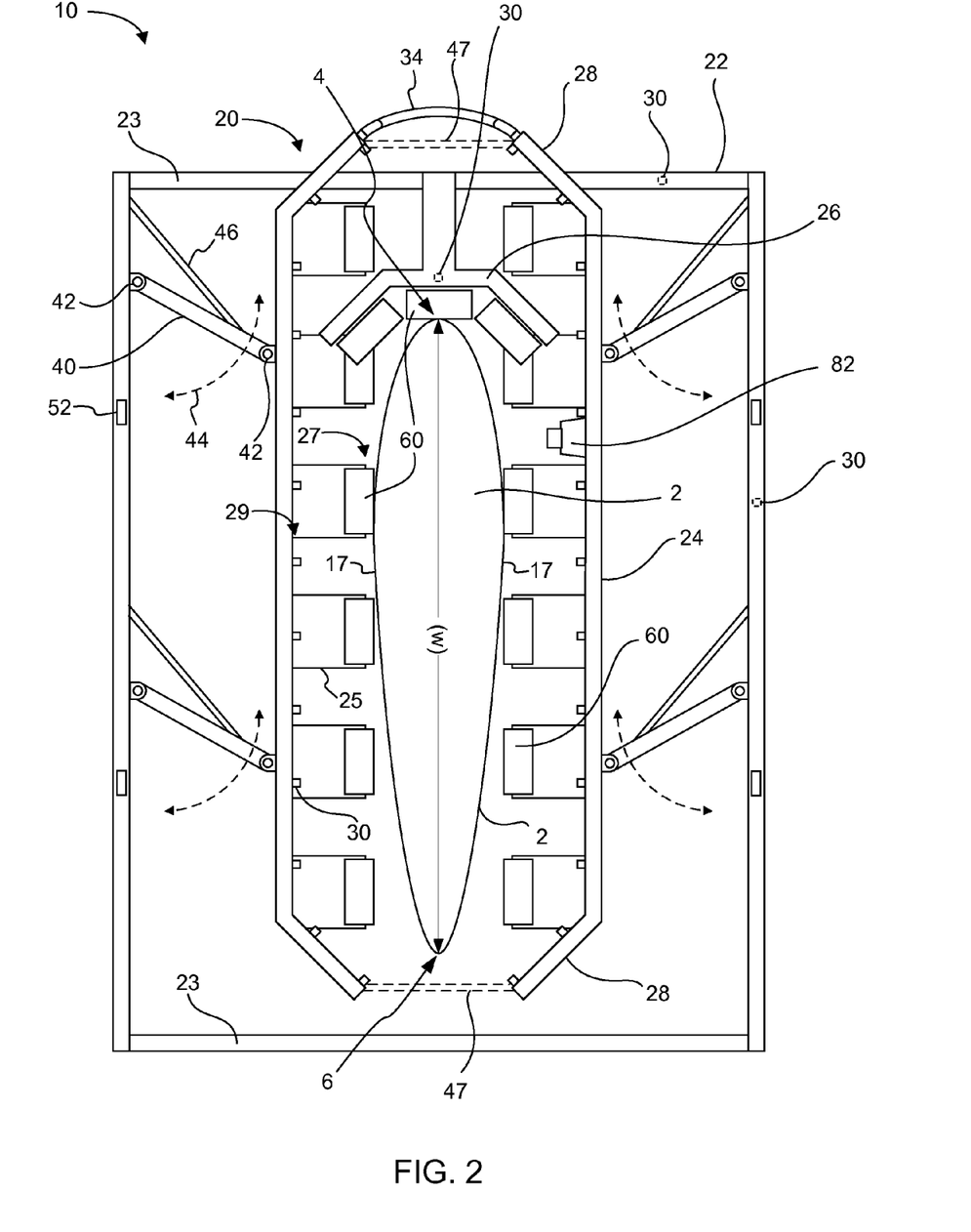
FIG. 2 is a top view of the wind turbine blade treatment apparatus of FIG. 1.

Referring to FIGS. 1 and 2, a wind turbine blade treatment apparatus, indicated generally at 10, in an example implementation in accordance with the disclosure is provided for cleaning, treating, painting, etc., a wind turbine blade 2. FIG. 1 is a side view of a wind turbine blade treatment apparatus positioned in position relative to the wind turbine blade. FIG. 2 illustrates a top view of the wind turbine blade treatment apparatus. The treatment apparatus is designed to position a sprayer 30 of fluid 32 in an advantageous position relative to the blade to enhance the cleaning capabilities of the apparatus. The wind turbine blade can vary in size and/or shape along its length 12. For example, a width 14 of the turbine blade can be relatively narrow at an end of the blade and wider at a middle region. Likewise, the turbine blade can have a varying thickness along the length. Other variations in turbine blade geometry can include changing curvature of blade side surfaces or a twist in the shape of the blade. Thus, the wind turbine blade treatment apparatus can be configured to accommodate any of the various wind turbine blade sizes and configurations and to position the sprayer in a beneficial position relative to the blade.

The wind turbine blade treatment apparatus 10 can be configured to clean the blade 2 as the apparatus moves along the length 12 of the blade in a direction 18. In the example shown, the blade is positioned vertically and the treatment apparatus moves up/down the blade while cleaning. However, the turbine blade can be cleaned in non-vertical blade orientations. For example, in one embodiment, the blade can be angle in a mostly downward configuration, or in another embodiment, the blade can be positioned essentially parallel to the ground (about 90 degrees relative to the downward position shown, as will be shown in further detail in FIG. 5 hereinafter).

Returning more specifically to FIGS. 1, and 2, the apparatus 10 can comprise a support 20 constructed from any suitable material. For example, wood, plastic, metal, fiberglass, etc. may be used to construct the support. In one aspect, to provide a sturdy, strong, rigid construction, metal may be used. In one aspect, the metal used to construct the support may be steel or a steel alloy. Other metal materials or non-metal materials may also be used. In one aspect, the support can be constructed by welding a plurality of frame pieces together to form the support. The support can be constructed so as to extend at least partially around the wind turbine blade 2, particularly along a width (w) of the blade. In some embodiments the support is constructed to extend completely around the wind turbine blade, as shown in FIG. 2. It should be noted that the sprayer 30 can be located anywhere on the support. In the embodiments discussed below, it will be seen that the sprayer can be located on a moving portion of the support in order to advantageously position the sprayer for cleaning the blade.

Figure 5:
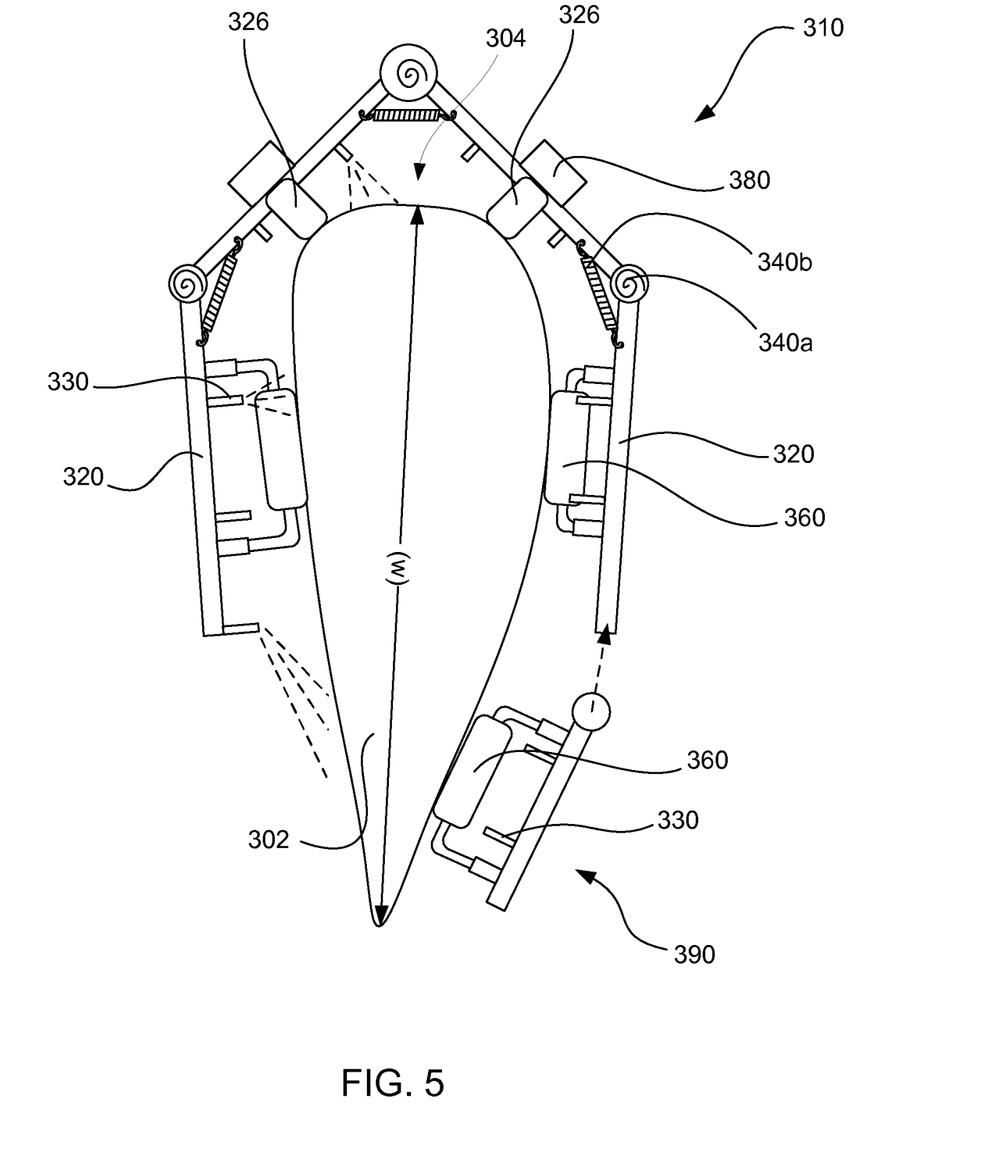
FIG. 5 depicts a cutaway section of a wind turbine blade with a wind turbine blade cleaning system thereon, in accordance with another embodiment of the present disclosure.

The support 20 can include a frame 22 and a side member 24 (or pair of side members optionally connected together). The frame can include an edge follower 26, which can be configured to be positioned at or near near an edge of the wind turbine blade, such as a leading edge 4 or a trailing edge 6. It is notable that the "edge" follower need not be positioned right on the very edge of the blade in all embodiments. For example, the edge follower may actually comprise multiple separate structures that flank the tip of the leading or trailing edge. An example of such an embodiment is shown in FIG. 5, where two edge following mobility components 326, e.g., rollers, are used on either side of the tip of the leading 304 edge so that two rollers in combination act as an "edge follower." Thus, the term "edge follower" does not infer that the follower actually contacts the tip of the leading or trailing edge, but rather, that the edge is generally followed by one or a combination of structures. The edge follower can guide the apparatus 10 as it moves along the length 12 of the blade 2. In use, the apparatus can be configured such that a force 8 maintains the edge follower in position near the turbine blade edge. In one example shown, the force can be provided by a cable 50a at an angle 16 to not only move the treatment apparatus up/down the turbine blade, but also to pull the edge follower against the edge of the blade. In non-vertical blade orientations, the apparatus can be engaged with the blade such that gravity can provide the force that maintains the edge follower in position near the edge of the turbine blade. In certain embodiments, the sprayer 30 can be located on the edge follower and/or the frame, in addition to or instead of on the side member.

In an alternative embodiment, the cable 50b can extend from the support 20 up to a top of the wind turbine tower, such as to or near the nacelle, and then extend downwardly toward a rope/cable climber or hoist 80 that is attached to the frame or other part of the treatment apparatus. The cable in this example is shown in phantom lines so as to not be confused with cable 50b in the alternative embodiment. A pulley or similar system can be used at the top of the wind turbine tower to facilitate movement of the cable as the apparatus is raised and lowered. In one example, the rope can be attached to an eyelet, passed through a pulley system at or near the top of the wind turbine, and fed through the hoist device to mechanically raise and lower the apparatus. Suitable hoists that can be used include those available from Skyclimber®, such as the Compact 1000, Compact 1250, or the Compact 1500. These particular hoists are suitable for use with heavy loads, and can be included with radio frequency remote control systems to control the direction of climb or lowering. These types of devices use "wire rope," but other devices that use different cables, ropes, chains, etc., can also be used. Furthermore, multiple hoists can be used for raising and/or lowering the support, as would be appreciated by one skilled in the art.

The side member 24 is a movable portion of the support 20 and can enable the treatment apparatus 10 to accommodate various turbine blade sizes and shapes. The side member can be connected to the frame 22 and configured to be positioned near the wind turbine blade 2, such as a side surface 17 of the blade. The side member can also be configured to extend at least partially along the width 14 of the wind turbine blade. In the embodiment shown, the side member extends beyond the width of the blade and includes end portions 28 that angle toward the blade, providing an advantageous mounting location for the sprayer 30. In certain embodiments, the apparatus can include a plurality of side members. In the embodiment shown, the side member extends out past the frame 22, and thus, the frame is configured with end portions 23 that drop down to accommodate the lateral movement of the side member. It is noted however that this is not the only configuration that can be used to accommodate this movement of the side member. For example the frame can be lengthened so that the side member swings within the frame (thus obviating the need to drop down the end portions); or the side member can be slightly raised to miss the frame as it moves laterally.

In a particular embodiment, the apparatus 10 can include a pair of side members 24, one on either side of the blade 2. To enable movement of the side members while supplying fluid to the apparatus from a single source, a flexible tube 34 can connect sections of the sprayer 30 to allow the side members to remain near the blade without disrupting the supply of fluid to the sprayer. That being said, supplying fluid to the apparatus from a single source is not required. Using a plurality of sources or hoses attached to the pipe can be cumbersome and cause additional difficulties, but sometimes may also be desirable, depending on the configuration. The flexible tube solution can work with a variety of side member and frame 22 configurations and can allow for use of a single fluid source to supply fluid for all of the sprayers on the apparatus.

The apparatus 10 can further include a linkage member 40 rotatably connecting the side member 24 to the frame 22. Since turbine blades can vary in size/shape along the length, the linkage member can be configured to enable the side member to be positioned near the wind turbine blade, for example, by rotating in direction 44. Providing a treatment apparatus capable of adjusting to the varying size and/or shape of a wind turbine blade can allow for adequate cleaning capabilities and maintaining stability of the apparatus against the blade. The apparatus can include pivots 42 attaching the linkage member to the frame to enable rotating or pivoting.

A restraining device 46 can extend between the frame 20 and linkage member 40 and can be configured to cause rotation of the linkage member. As discussed above, rotation of the linkage member can cause the side member 24 to maintain position near the turbine blade. Thus, the restraining device can be attached to the frame and the linkage member in any suitable location or configuration that can enable the restraining device to cause rotation of the linkage member. In an alternate embodiment, the restraining device 47 can be attached between a plurality of side members. In one aspect, the restraining device may comprise elastic or spring-like members. In a specific aspect, the restraining device may comprise bungee cords with hooks on the ends that can attach to the frame and the linkage member. Springs or other mechanical tensioning devices can alternatively be used.

As the apparatus 10 moves along the blade 2 to a relatively wide or thicker portion of the blade, the linkage members 40 rotate to allow for outward movement of the side member 24 as it maintains position near the turbine blade and is forced outward by the turbine blade. This rotation of the linkage member increases the tension the restraining device 46. As the apparatus 10 moves along the blade 2 to a relatively narrow or thinner portion of the blade, the tension in the restraining device causes the linkage members to rotate, providing inward movement of the side member and causing it to maintain its position near the turbine blade. This rotation of the linkage member decreases the tension the restraining device.

The support 20 can further include a separator structure 25. The separator structure can be configured to extend between the side member 24 and the wind turbine blade 2 to position the side member a predetermined distance away from the wind turbine blade. The separator structure can be attached to the support, such as the side member or edge follower 26, and can have a traversing end 27 positionable near the wind turbine blade. The separator structure may be integrally formed with the support, permanently attachable to the support, or removably attachable to the support. The separator structure need not be limited to any particular structure or shape. Any variety of structures or shapes may also be used which can provide a desired separation of the support or support components from the wind turbine blade.

As will be described in additional detail below, sprayers 30 may form a part of the apparatus 10. Positioning the side members 24 at a predetermined distance away from the wind turbine blade 2 can enable the sprayers to spray fluid 32 over a larger area of the wind turbine blade than if the sprayers were directly adjacent to the wind turbine blade. A length of the separator structure can vary between embodiments. In one aspect, the length of the separator structure can be determined according to a swath of a fluid spray from the sprayer. In other words, the separator structure can be determined according to an optimal spraying distance for the sprayers. Too large of a length of the separator structure may result in not applying a sufficient amount of fluid from the sprayer to the blade or that the sprayer cannot adequately spray the fluid onto the blade. Too small of a length of the separator structure may result in not providing the coverage of fluid on the blade as may be desired or may necessitate an increase in the number of sprayers around the support 20, thus increasing cost. Also, when increasing the number of sprayers, fluid pressure may also be increased to achieve desired spraying performance.

The separator structure 25 can include an attachment end 29 attached to the support 20 and a traversing end 27 positionable near the wind turbine blade 2. The traversing end can be operatively attached to one or more mobility components 60. The mobility component can enhance the ability of the apparatus to move along the length 12 of the blade. Various types of mobility components are contemplated. Any suitable device or structure which allows the apparatus to be supported against the wind turbine blade and to be moved along the length of the blade while causing little or no damage to the surface of the wind turbine blade may be used as a mobility component. The mobility component can be a slider, roller, track, wheel, or some other translational movement aid or friction reducing material or component.

The mobility component 60 can be attached to the support 20. In one aspect, the mobility component can be attached to the frame 22. In another aspect, the mobility component can be attached to the edge follower 26. In yet another aspect, the mobility component can be attached to the side member 24. In a particular aspect, the mobility component can be attached to the traversing end 27 of the separator structure 25. One or more mobility components may be positioned at a traversing end of each of the separator structure. In one aspect, the separator structure further comprises a member to enable positioning a plurality of sliders at the traversing end with a predetermined distance between the sliders. In addition to the separator structure, the mobility component can affect the distance of the side member from the blade in addition to facilitating movement of the treatment apparatus along the length of the blade.

As described above, the frame 22 can extend completely or partially around a wind turbine blade 2. Where the support extends only partially around the wind turbine blade, the support may include an opening by which the support may be placed adjacent to and partially around the wind turbine blade. Also, where the support does not completely extend around the wind turbine blade, steps can be taken to clean around the entire wind turbine tower. One solution may be to use the apparatus multiple times on the blade to effect cleaning of the entire blade. For example, the apparatus may make one cleaning pass with the edge follower being near a leading edge 4 of the blade. The apparatus may then make another cleaning pass with the edge follower being near a trailing edge 6 of the blade. It should be understood that the edge follower can be near the leading or trailing edges of the blade on any given cleaning pass. As another example solution, although the frame may not fully extend around the blade, the sprayers may be configured to provide sufficient coverage of fluid on the blade such that a full encompassment of the blade by the frame is not required.

Regardless of whether the support 20 completely or partially extends around the wind turbine blade 2, the support may be capable of being assembled and disassembled. The support can be transported to a wind turbine in a disassembled state on a utility vehicle. The support can be assembled at and/or around a wind turbine blade. The apparatus can then be used to clean the wind turbine blade. After cleaning, the apparatus and/or support can be disassembled, loaded onto the vehicle, and taken to another destination.

Cleaning fluid can be delivered to the blade 2 by a sprayer 30. As mentioned above, the sprayer can be connected anywhere on the support 20 and can be configured to spray fluid 32 onto the wind turbine blade. In one aspect, the sprayer can be connected to the side member 24. In another aspect, the sprayer can be connected to the frame 22. In yet another aspect, the sprayer can be connected to the edge follower 26. In still another aspect, the sprayer can be connected to the aforementioned support components in any combination. Furthermore, the sprayers may be removably attached or permanently attached. In one aspect, the sprayers may even be integrally formed with the support.

The sprayer 30 can include a sprayer support member 35 to support one or more sprayer heads 36 away from the support 20 and/or the linkage members 40. The sprayer support member can hold the sprayer heads in a position such that regardless of the position of the side member 24 relative to the frame 22, the apparatus 10 is still capable of providing adequate fluid coverage to the wind turbine blade 2. The sprayer support member can be configured in such a way that neither the sprayer heads nor the sprayer support members hinder the movement of the side member or the linkage members. For example, in some embodiments the sprayer support member can be aligned differently from the support such that during movement of the side member the sprayer support member and the sprayer heads on the sprayer support member do not come in contact with a portion of the support to which the sprayer support member is not attached or to other sprayer heads associated with that portion of the support. Furthermore, like the separator structure 25, the sprayer support member can be configured to position the sprayer at a given distance from the blade in order to achieve a desired spray of fluid on the blade.

The sprayers 30 may comprise any suitable spraying device capable of spraying a desired fluid 32 onto the wind turbine blade 2. The sprayers illustrated in FIG. 1 include the sprayer support member 35 that provides clearance of the spray nozzle 36 section beyond the treatment apparatus 10 when fluid is sprayed from the spray nozzle. However, the sprayers may comprise any desired configuration and may spray fluid from any desired position with respect to the support and/or the blade or at any desired direction towards the blade. In one aspect, the apparatus may be implemented with a single sprayer, but due to a size of the wind turbine blade, a single sprayer may not adequately spray fluid to an entire blade surface without rotations and multiple cleaning passes of the apparatus. Typically, the apparatus may comprise a sufficient number of sprayers that the blade can be sufficiently sprayed with fluid in one or two passes along the wind turbine blade.

The sprayers 30 can be interconnected such that all of the sprayers receive fluid from the same fluid supply. A fluid pipe can extend between each of the sprayers to provide fluid to the sprayers. In the example shown, the fluid pipe is disposed inside the side member 24 or support 20. In other examples, the fluid pipe can be located outside or adjacent to the side member or support. Fluid may be supplied to the fluid pipe through a fluid hose 70. The fluid hose may in turn be connected to a fluid supply. In one aspect, the fluid supply may be a fluid tank carried by a utility vehicle to the site of the wind turbine. The fluid hose can attach to the fluid pipe at a hose attachment section 72. The hose attachment section can securely attach the hose to the fluid pipe to supply fluid to the sprayers, even when the apparatus is raised high up against the blade and the weight of the fluid hose pulls at the attachment section.

The hose 70 can be attached to the fluid pipe using any suitable hose connection means. In one aspect, the hose is attached using a hose screw connection on the pipe. The hose can be screwed onto the hose screw connection to secure the hose to the pipe. As an additional safety feature, the hose can be secured to the support 20 of the apparatus 10, such as a side member 24 or frame 22. For example, the apparatus may include a safety device 74 configured to secure the hose to the treatment apparatus to prevent the hose from falling to the ground if the hose disconnects from the pipe. Generally, the hose will remain securely attached to the pipe and the safety device may simply be a backup in case of failure of the attachment between the hose and the pipe. The safety device can prevent an event which may otherwise cause significant injury to persons or property on the ground beneath a hose falling from a significant height. Furthermore, in one example, if water pressure is a concern or if higher water pressure is desired, then valves 84 can be positioned at various locations along the frame (along pipes) to selectively shut off sprayers to increase water pressure to other sprayers, and vice versa.

The apparatus 10 can also include an attachment point 52, such as an eyelet, for a cable or other mechanism that can be used to move the apparatus along the length 12 of the blade 2. The cable 50a can extend to the top of the wind turbine, which can provide a support for the cable to move the apparatus along the blade. Any number of attachments may be made to the support to facilitate moving the apparatus.

In one aspect, the sprayers 30 can be configured to spray a cleaning or treatment solution, or even a blade surface sealing solution or paint. In another aspect, the sprayers can be configured to spray a high pressure rinse, such as a water rinse or other dilute rinsing solution, onto the blade surface. In one example embodiment, the sprayers can spray a cleaning or treatment solution while the apparatus is moved along the length 12 of the blade 2 in one direction and the sprayers can spray a rinse while the apparatus is moved along the length of the blade in the opposite direction to rinse off the cleaning solution. In this manner, an entire wind turbine blade surface may be cleaned in a single end-to-end cycle of moving the apparatus along the length of the blade.

No maintenance workers need be present on the apparatus 10. An entire wind turbine blade can be cleaned in a matter of hours, as opposed to the days or weeks spent cleaning using previous cleaning methods. The apparatus does not involve putting maintenance workers in precarious or hazardous positions. The apparatus can save a substantial amount of time and money and provide a simple, safe, and effective means of quickly cleaning wind turbine blades.

It is noted that one or more camera(s) 82 can be mounted on the support 20, e.g., frame 22 or side member 24, to monitor the cleaning, the sprayer 30, the location of the blade 2 in relation to the turbine tower, etc. Though the camera is not shown in other embodiments, the camera can be applied to each embodiment of the present disclosure and configured as described herein. For example, the camera can be configured to provide video or still images, depending on the desired application. Also, the camera or multiple cameras can have a fixed position, or can be actionable to pan, zoom, tilt, etc., either automatically, or by remote control. Furthermore, the positioning of the camera in this embodiment is for exemplary purposes only, and can be moved to any place on the frame or other structure to provide the still or video imaging desired by the user.

Figure 3:
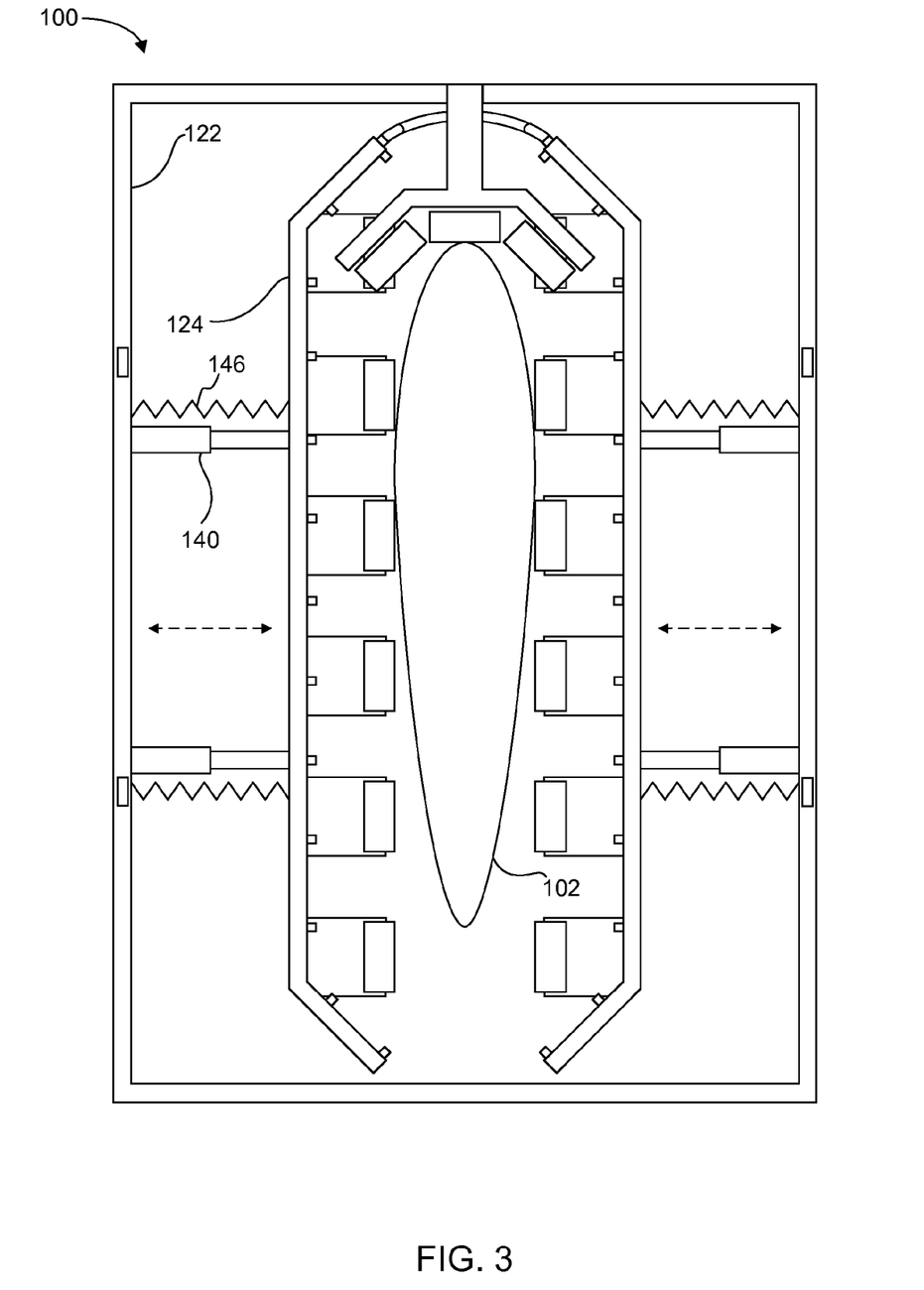
FIG. 3 is a top view of an a wind turbine blade treatment apparatus, in accordance with another embodiment of the present disclosure.

FIG. 3 illustrates a top view of another embodiment of a wind turbine blade treatment apparatus 100. This figure illustrates that the apparatus can include an expansion member 140 connecting the side member 124 to the frame 122. The expansion member can have a variable length, thus enabling the side member to be positioned near the blade 102 as the apparatus moves along the blade and the size/shape of the blade changes along its length. In one aspect, the expansion member is telescopic to vary the length. Also depicted in the figure is a restraining device 146 coupled with the expansion member. As illustrated, the expansion member is located next to the restraining device and they are connected to the side member and frame in parallel. In another embodiment, the restraining device can be located inside the expansion member. The restraining device can be configured to cause the length of the expansion member to vary. In one aspect, the restraining device can be configured to provide a force that causes the expansion member to increase in length.

In a particular example, the restraining device 146 can comprise a spring that urges the expansion member 140 to telescope outwardly, causing the side member 124 to be positioned near the wind turbine blade 102. For example, as the apparatus moves along the blade to a relatively wide portion of the blade, the expansion members become shorter to allow for outward movement of the side member as it maintains position near the turbine blade and is forced outward by the turbine blade. This shortening of the expansion member can increase the force in the restraining device. As the apparatus moves along the blade to a relatively narrow portion of the blade, the force in the restraining device causes the expansion members to lengthen, providing inward movement of the side member and causing it to maintain its position near the turbine blade. This lengthening of the linkage member can decrease the tension the restraining device.

Figure 4:
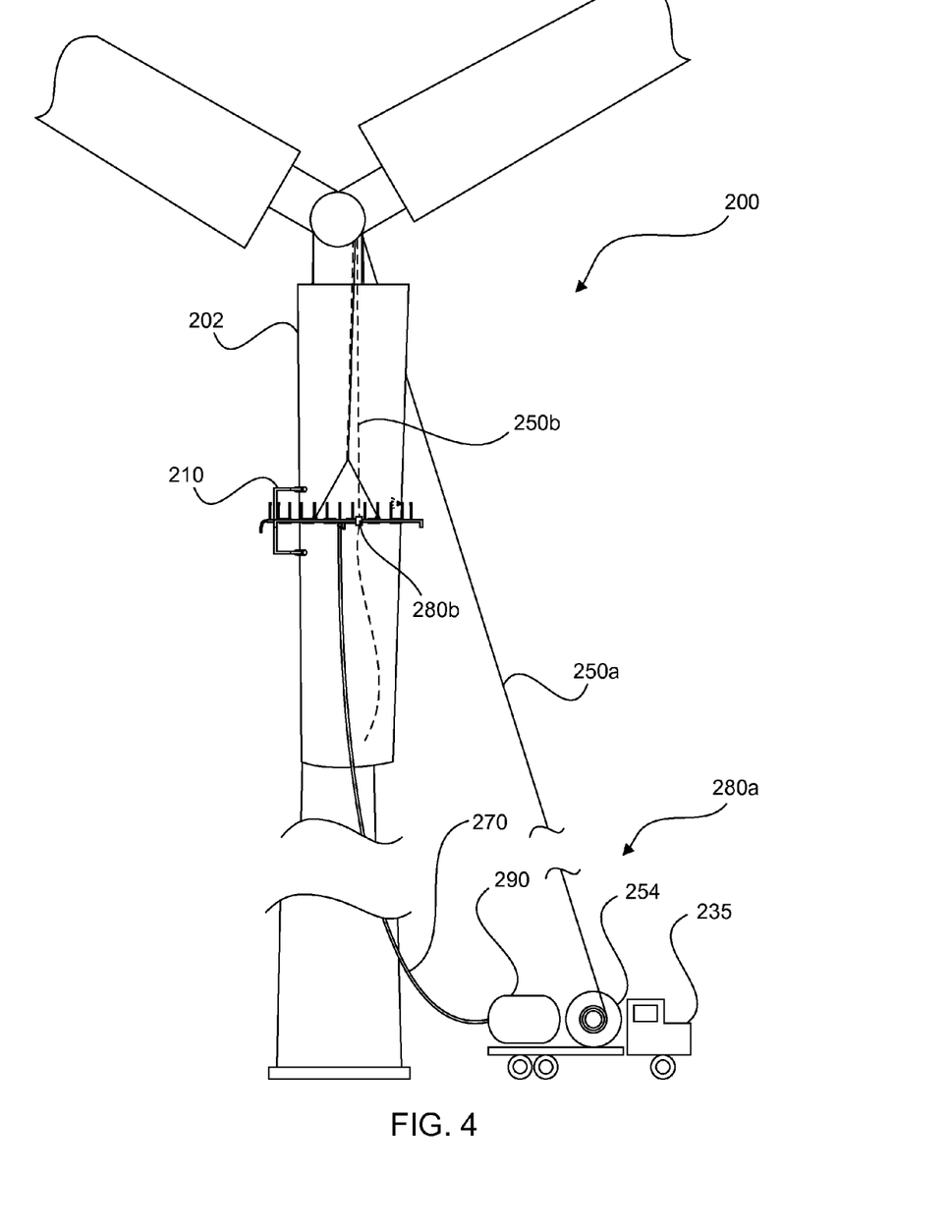
FIG. 4 is a front view of a wind turbine blade cleaning system, in accordance with an embodiment of the present disclosure.

Reference will now be made to FIG. 4, which illustrates a front view of a wind turbine blade 202 being cleaned by a wind turbine blade cleaning system 200. In the example shown, the blade is in a vertical orientation, however, the principles illustrated can apply to a blade in a non-vertical orientation. The wind turbine blade cleaning system includes a treatment apparatus 210, a conveyor 280a or 280b, and a fluid supply 290, in accordance with one embodiment. The wind turbine blade treatment apparatus may comprise an apparatus such as described above in FIGS. 1-3 or combinations of embodiments described therein.

FIG. 4 further depicts a utility vehicle 235 carrying the fluid supply 290. The fluid supply can be connected to the wind turbine blade treatment apparatus. The fluid supply can include a plurality of fluid reservoirs for supplying a plurality of fluid types, such as water, cleaning solution, etc. A hose 270 extends from the fluid supply to the treatment apparatus 210. FIG. 4 illustrates a conveyor 280a connected by a cable to the treatment apparatus by which the treatment apparatus can be moved along the length of the wind turbine blade. In this example, the conveyor can include a cable 250a and a winch 254. The cable can extend from the treatment apparatus up to a top of the wind turbine, such as to or near the nacelle, and then extend downwardly toward the winch on the utility vehicle. A pulley or similar system can be used at the top of the wind turbine to facilitate movement of the cable as the treatment apparatus is moved along the blade.

In another embodiment, the winch may be positioned on the ground near the wind turbine and need not be attached to the utility vehicle. Alternatively, a winch may be provided at the top of the wind turbine for use in moving the treatment apparatus. Various lift devices for moving the apparatus on the wind turbine blade may also be used. For example, a crane or other lift device may be used. In some embodiments, an uplift device, such as a balloon or other similar device can be used to move objects along wind turbines. Virtually any device capable of moving the apparatus along the length of the blade may be used with the treatment apparatus described herein.

Alternatively, as shown in FIG. 4, a mechanism by which the cleaning or coating apparatus can be raised and lowered along the height of the wind turbine tower can be provided as attached to the treatment apparatus 210. A cable 250b extends from the cleaning or coating apparatus up to a top of the wind turbine tower, such as to or near the nacelle, and then extends downwardly toward an alternative conveyer 280b, which in this example is a rope/cable climber or hoist that is attached to the frame or other part of the treatment apparatus. A pulley or similar system can be used at the top of the wind turbine tower to facilitate movement of the cable as the apparatus is raised and lowered. By using a hoist, a separate winch or other similar device that is next to the wind turbine tower (such as on an adjacent truck) need not be used. Thus, in this embodiment, only the fluid hose is connected to a separate unit, such as a utility vehicle, though other connections to a separate unit or vehicle is not precluded, e.g., providing power to remote control device, providing power to the hoist, etc.

Turning now to FIG. 5, an alternative embodiment of a treatment apparatus 310 is shown, which does not use a cable to move the treatment apparatus vertically along a blade as previously described. In this particular example, the wind turbine blade 302 is moved to a horizontal or mostly horizontal position, e.g. from 70 to 110 degrees in relation to the wind turbine tower (not shown in FIG. 5), and the leading edge 304 of the blade is positioned to face generally upwardly. In this example, a support 320 configured to extend at least partially along a width (w) of the wind turbine blade. The support includes multiple rigid elongated structures, e.g., rigid piping with internal water supply tubing or solid structures with adjacent water supply tubing, connected together by biased hinges 340a or 340b. The hinges can be biased or spring loaded internally, as is shown with respect to 340a; and/or can be biased externally, as shown with respect to 340b. Both are considered to be a "biased hinge" in accordance with examples of the present disclosure. Specifically, the biased hinge allows for contraction or expansion of the support in relation to a dimension of the wind turbine blade. Thus, as the blade gets thicker or thinner along the width (w), the support can expand or contract, keeping the sprayers 330 in close proximity to the wind turbine blade. To prevent the support or other attachments, such as the sprayers, from contacting the wind turbine blade unintentionally, a mobility component is attached to the support for contacting the wind turbine blade. Specifically, as shown, the mobility component is a roller or pair of rollers that passively roll along the blade when contacted therewith. Conversely, to cause movement of the treatment apparatus along the leading edge (or trailing edge), an edge follower 326 can be used. In this example, the edge follower includes a pair of rollers that flank the leading edge, e.g., which are at or near an edge of a wind turbine blade. In one embodiment, the pair of rollers utilize one or more motor(s) to roll the edge followers along the width of the blade during a treatment cycle. Thus, cable is not used in this embodiment to generate movement of the treatment apparatus, as previously described in FIGS. 1-4.

In further detail with respect to the treatment apparatus of FIG. 5, as well as the other embodiments, an attachment arm can be included to modify the sprayer coverage of the treatment apparatus. In this particular example, a lower arm attachment 390 is included that can be attached to the support, thereby extending the support either with an additional hinge or by direct attachment. The lower arm attachment can include a mobility component 360 and an additional sprayer 330, along with any of the other components described herein.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A wind turbine blade treatment apparatus, comprising:
   a support comprising:
      a frame with an edge follower configured to be positioned at or near an edge of a wind turbine blade, and
      a side member connected to the frame, configured to extend at least partially along a width of the wind turbine blade and to be positionable near the wind turbine blade;
   a sprayer connected to the support, configured to spray fluid onto the wind turbine blade, at least one sprayer being directly connected to the side member;
   a linkage member rotatably connecting the side member to the frame, configured to enable the side member to be positioned near the wind turbine blade; and
   a restraining device extending between the frame and linkage member, configured to cause rotation of the linkage member.

2. An apparatus in accordance with claim 1, wherein the edge of the wind turbine blade is a leading edge.

3. An apparatus in accordance with claim 1, wherein the edge of the wind turbine blade is a trailing edge.

4. An apparatus in accordance with claim 1, wherein the restraining device comprises an elastic member.

5. An apparatus in accordance with claim 1, further comprising:
   a separator structure attached to the side member having a traversing end positionable near the wind turbine blade, the separator structure being configured to extend between the side member and the wind turbine blade to position the side member a predetermined distance away from the wind turbine blade; and
   a mobility component attached to the traversing end of the separator structure, configured to facilitate movement along a surface of the wind turbine blade as the frame is moved along a length of the wind turbine blade.

6. An apparatus in accordance with claim 1, wherein the side member comprises a plurality of side members and the apparatus further comprises a flexible tube extending between two of the plurality of side members to allow the plurality of side members to be positioned near the wind turbine blade without disrupting fluid supply to the sprayer.

7. An apparatus in accordance with claim 1, further comprising a camera attached to the support.

8. An apparatus in accordance with claim 1, further comprising a hoist attached to the support for lifting and lowering the treatment apparatus.

9. An apparatus in accordance with claim 1, comprising a plurality of sprayers connected to the support.

10. An apparatus in accordance with claim 9, further comprising at least one valve for selectively shutting off a portion of the sprayers while a second portion of the sprayers remain active.

11. An apparatus in accordance with claim 10, wherein the valve is solenoid valve controlled by a timer or radio frequency.

12. A wind turbine blade treatment apparatus, comprising:
   a support configured to extend at least partially along a width of the wind turbine blade, the support further including:
   an edge follower configured to be positioned at or near an edge of a wind turbine blade, wherein the edge follower comprises a motorized roller configured to move the support along an edge of the wind turbine blade, and
   a biased hinge configured to allow for contraction or expansion of the support in relation to changing dimensions of the wind turbine blade along a length of the wind turbine blade; and
   a sprayer connected to the support configured to spray fluid onto the wind turbine blade,
   wherein the width of the wind turbine blade comprises a leading edge and a trailing edge that is opposite the leading edge and narrower than the leading edge, and
   wherein the wind turbine blade treatment apparatus is configured to embrace and move along one of the leading edge or the trailing edge.

13. An apparatus in accordance with claim 12, wherein the edge follower includes a motorized wheel that causes the apparatus to travel along a length of the wind turbine blade.

14. An apparatus in accordance with claim 12, further comprising passive mobility components configured to contact the wind turbine blade resulting from pressure provided by the biasing hinge.

15. An apparatus in accordance with claim 12, further comprising a lower arm attachment with an additional mobility component and an additional sprayer, the lower arm attachment extending the support further along the width of the wind turbine blade.

16. An apparatus in accordance with claim 12, further comprising a camera attached to the support.

17. An apparatus in accordance with claim 12, comprising a plurality of sprayers connected to the support.

18. An apparatus in accordance with claim 17, further comprising at least one valve for selectively shutting off a portion of the sprayers while a second portion of the sprayers remain active.

19. An apparatus in accordance with claim 18, wherein the valve is solenoid valve controlled by a timer or radio frequency.

20. A wind turbine blade treatment system, comprising:
   a wind turbine blade treatment apparatus having
   a support with an edge follower configured to be positioned at or near an edge of a wind turbine blade, the support also configured to extend at least partially along a width of the wind turbine blade and to be positionable near the wind turbine blade, wherein the support includes a frame and a side member connected to the frame, wherein the edge follower is part of the frame, and the side member is configured to extend at least partially along a width of the wind turbine blade;
   a linkage member rotatably connecting the side member to the frame, configured to enable the side member to be positioned near the wind turbine blade;
   a restraining device extending between the frame and linkage member, configured to cause rotation of the linkage member;
   a sprayer connected to the support, configured to spray fluid onto the wind turbine blade, at least one sprayer directly connected to the side member;
   a conveyor connected to the wind turbine blade treatment apparatus, configured to move the treatment apparatus along a length of the wind turbine blade; and
   a fluid supply connected to the wind turbine blade treatment apparatus.

21. A system in accordance with claim 20, wherein the edge follower includes a mobility component configured to follow the wind turbine blade.

22. A system in accordance with claim 21, wherein the edge follower includes multiple motorized mobility components configured to be positioned at or near a leading edge of the wind turbine blade.

23. A system in accordance with claim 20, wherein the conveyor comprises a winch and a cable or rope.

24. A system in accordance with claim 20, wherein the conveyor comprises a hoist attached to the wind turbine blade treatment apparatus and a cable or rope.

25. A system in accordance with claim 21, wherein the conveyor comprises a motor attached to a mobility component, wherein the motor moves the mobility component, thereby causing the support to move along the wind turbine apparatus.

26. A system in accordance with claim 20, wherein the conveyor and the fluid supply are located on a utility vehicle.

27. A system in accordance with claim 20, wherein the conveyor is located on the wind turbine blade treatment apparatus, and the fluid supply is located on a utility vehicle.

28. A system in accordance with claim 20, wherein the fluid supply comprises a cleaning fluid.

29. A system in accordance with claim 20, wherein the fluid supply comprises a coating material or paint.

* * * * *